United States Patent
Riepenhoff et al.

(10) Patent No.: US 7,036,498 B2
(45) Date of Patent: May 2, 2006

(54) MULTI-POSITION FURNACE

(75) Inventors: Matthew S. Riepenhoff, Flower Mound, TX (US); Floyd E. Cherington, Carrollton, TX (US); Cyril E. Fowble, IV, Frisco, TX (US); Glenn W. Kowald, Carrollton, TX (US); Charles T. Post, Mesquite, TX (US); Randy D. Smith, Marshalltown, IA (US)

(73) Assignee: Lennox Manufacturing Inc., Richardson, TX (US)

( * ) Notice: Subject to any disclaimer, the term of this patent is extended or adjusted under 35 U.S.C. 154(b) by 102 days.

(21) Appl. No.: 10/732,642

(22) Filed: Dec. 10, 2003

(65) Prior Publication Data

US 2005/0126558 A1  Jun. 16, 2005

(51) Int. Cl.
*F24H 3/02* (2006.01)

(52) U.S. Cl. ............................... 126/110 R; 126/116 R

(58) Field of Classification Search ............ 126/110 R, 126/116 R, 116 A, 99 R, 113; 165/913
See application file for complete search history.

(56) References Cited

U.S. PATENT DOCUMENTS

| | | | |
|---|---|---|---|
| 4,892,045 A | * | 1/1990 | Schumacher ................ 110/203 |
| 5,309,890 A | | 5/1994 | Rieke et al. |
| 5,346,001 A | | 9/1994 | Rieke et al. |
| 5,375,586 A | * | 12/1994 | Schumacher et al. ... 126/110 R |
| 5,379,749 A | | 1/1995 | Rieke et al. |
| 5,582,159 A | * | 12/1996 | Harvey et al. .......... 126/110 R |
| 5,704,343 A | * | 1/1998 | Ahn et al. .............. 126/110 R |
| 5,749,355 A | | 5/1998 | Roan et al. |
| 5,775,318 A | * | 7/1998 | Haydock et al. ........ 126/110 R |

FOREIGN PATENT DOCUMENTS

EP          0 211 585     *  2/1987

* cited by examiner

*Primary Examiner*—Josiah C. Cocks
(74) *Attorney, Agent, or Firm*—Brooks Kushman P.C.

(57) ABSTRACT

A multi-position furnace is provided that can be positioned for downflow operation, upflow operation, left horizontal flow operation, or right horizontal flow operation without major modifications in the field. The furnace includes a multi-position condensate draining system which facilitates draining of condensate fluid regardless of the orientation of the furnace. The condensate draining system includes a header box and an exhaust manifold, each of which includes a number of drain ports that allow fluid condensing from combustion gasses to be drained regardless of furnace orientation. A trap is configured for attachment to the furnace in any one of four different positions, and receives condensate fluid from the header box and from the exhaust manifold. An air intake manifold is specially configured to maintain a low profile, thereby facilitating use of the multi-position condensate draining system.

11 Claims, 7 Drawing Sheets

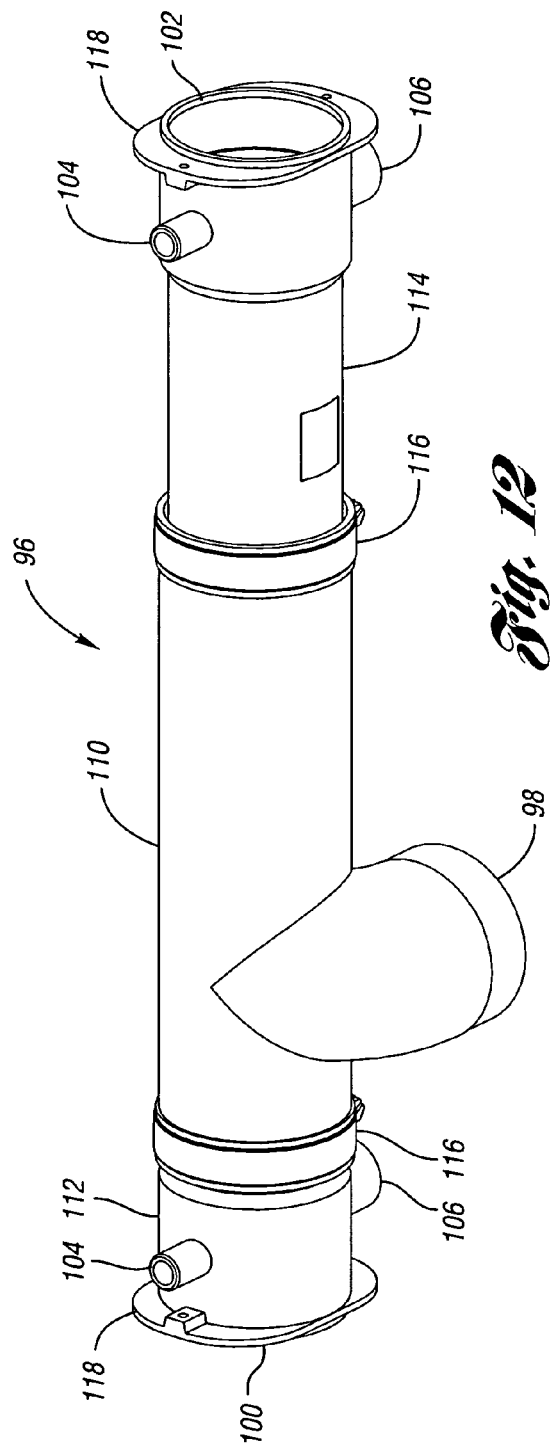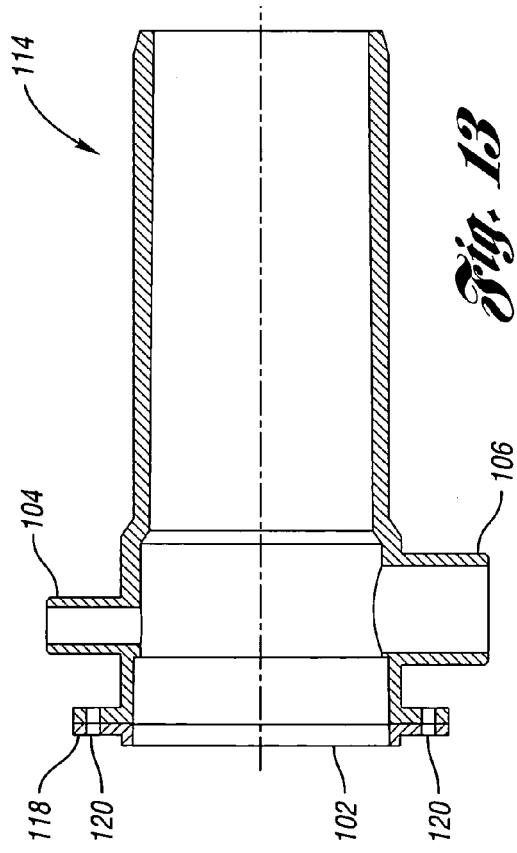

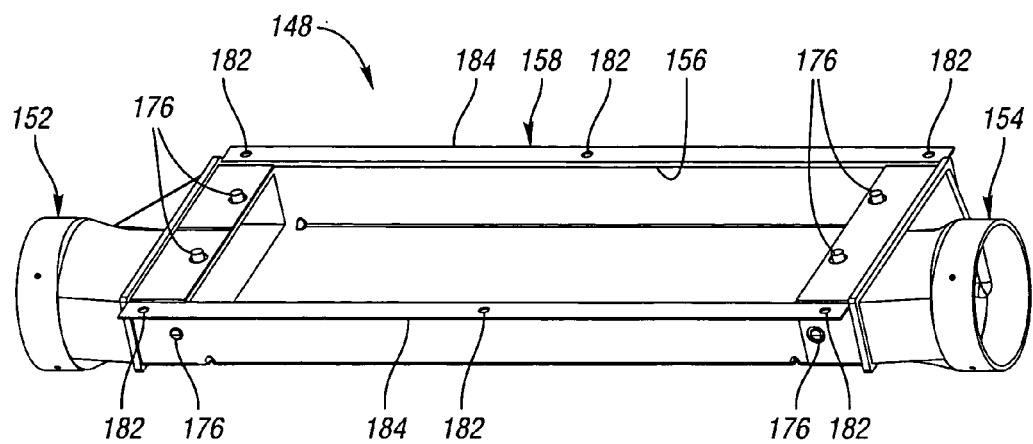
Fig. 17
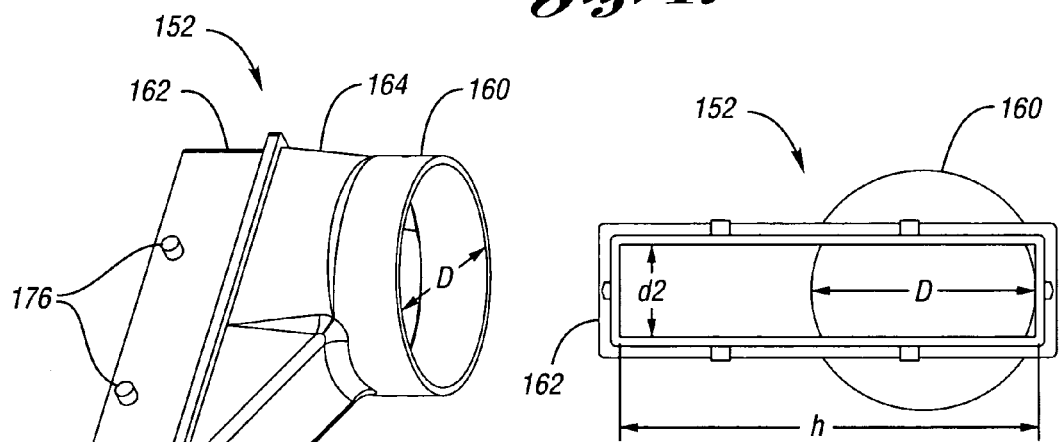
Fig. 18
Fig. 19
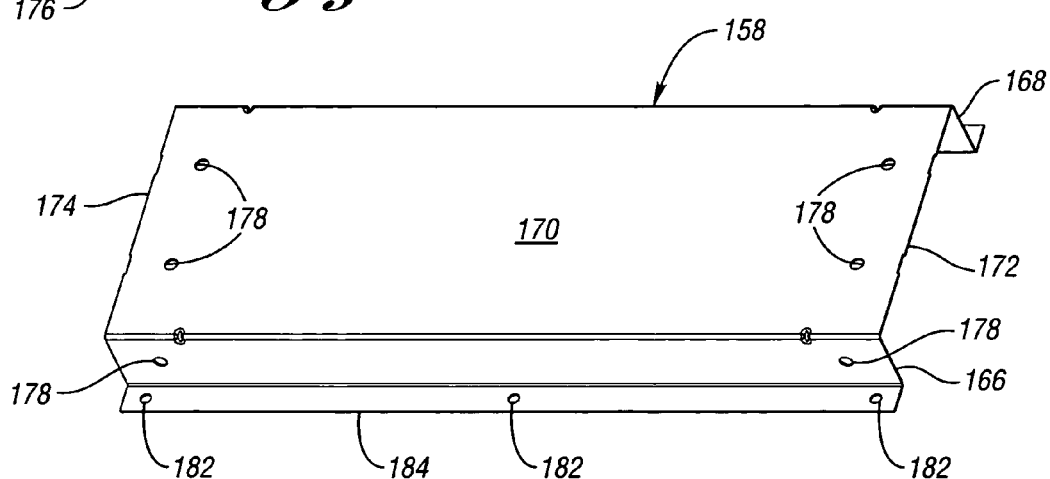
Fig. 20

MULTI-POSITION FURNACE

BACKGROUND OF THE INVENTION

1. Field of the Invention

The present invention relates to a multi-position furnace, and in particular, to a furnace capable of operating in upflow, downflow, and horizontal positions.

2. Background Art

Installation of furnaces can be a time consuming and costly process, particularly when space is limited. Because of space limitations, an installation technician may need to orient a furnace one particular way in order to install the furnace in the desired location. When a furnace is configured from the factory to be installed in only one or two different orientations, it may not be able to fit into the desired location. When this occurs, one of a number of events must take place: the furnace must be installed in a different location, a different furnace must be installed, or the existing furnace must be modified in the field to accommodate the desired location. Having an installation technician modify various components of a furnace in the field adds complexity, time and cost to the installation.

Therefore, a need exists for a furnace that can be installed in various vertical and horizontal positions, so as to eliminate the need for extensive modification of furnace components in the field.

SUMMARY OF THE INVENTION

Accordingly, the present invention provides a furnace for supplying heated air to a space to be heated and capable of being installed in more than one position. The furnace includes at least one burner and a heat exchanger in communication with the at least one burner to receive products of combustion therefrom. The furnace further includes an inducer in communication with the heat exchanger for inducing a flow of products of combustion through the heat exchanger and out of the furnace. The furnace comprises a multi-position condensate draining system. The condensate draining system includes a manifold disposed between the heat exchanger and the inducer. The manifold includes at least three drain ports positioned to drain fluid, such that at least one of the drain ports is capable of draining fluid from the manifold when the furnace is positioned for downflow operation, upflow operation, left horizontal flow operation, or right horizontal flow operation.

The invention also provides a furnace for supplying heated air to a space to be heated and capable of being installed in more than one position. The furnace includes at least one burner and a heat exchanger in communication with the at least one burner for receiving products of combustion therefrom. The furnace includes an inducer in communication with the heat exchanger for inducing a flow of products of combustion through the heat exchanger and out of the furnace. The furnace comprises a multi-position condensate draining system. The condensate draining system includes an exhaust manifold in communication with the inducer and an ambient environment. The exhaust manifold is configured to facilitate transfer of combustion gases out of the furnace. The exhaust manifold includes at least three drain ports positioned to drain fluid from the exhaust manifold. At least one of the drain ports is capable of draining fluid when the furnace is positioned for downflow operation, upflow operation, left horizontal flow operation, or right horizontal flow operation.

The invention further provides a furnace for supplying heated air to a space to be heated and capable of being installed in more than one position. The furnace includes a cabinet generally defining a furnace interior, at least one burner, and a heat exchanger. The heat exchanger is in communication with the at least one burner, and receives products of combustion therefrom. The furnace further includes an inducer in communication with the heat exchanger for inducing a flow of products of combustion through the heat exchanger and out of the furnace. The furnace also includes a plurality of manifolds, each of which is configured to receive products of combustion and to facilitate transfer of combustion products out of the manifold. The furnace comprises a multi-position condensate draining system. The condensate draining system includes at least three connectors attached to the cabinet. Each of the connectors includes at least one inlet cooperating with a corresponding cabinet wall to facilitate fluid flow through the corresponding cabinet wall. The connectors are positioned on the cabinet such that at least one of the connectors is capable of receiving fluid through a corresponding connector inlet when the furnace is positioned for downflow operation, upflow operation, left horizontal flow operation, or right horizontal flow operation. The condensate draining system further includes a trap having at least one inlet cooperating with one of the connectors to receive fluid from a corresponding connector inlet. The trap is in communication with an ambient environment, and is configured to inhibit non-liquid products from passing through the trap and into the ambient environment.

The invention also provides a furnace for supplying heated air to a space to be heated and capable of being installed in more than one position. The furnace includes an air intake for receiving air from an ambient environment, at least one burner, and a heat exchanger in communication with the at least one burner to receive products of combustion therefrom. The furnace further includes an inducer in communication with the heat exchanger for inducing a flow of products of combustion through the heat exchanger and out of the furnace. The furnace comprises an air intake manifold disposed between the furnace air intake and the heat exchanger, and configured to facilitate airflow therebetween. The air intake manifold includes an outlet and at least one inlet. The at least one inlet communicates with the furnace air intake, and the outlet communicates with the at least one burner. The at least one inlet includes a first portion with a first cross section having a linear dimension and defining a first area. The at least one inlet also includes a second portion with a quadrilateral cross section having a depth and a height and defining a second area. The depth of the quadrilateral cross section is smaller than the linear dimension of the first cross section.

BRIEF DESCRIPTION OF THE DRAWINGS

FIG. 12 is an isometric view of an exhaust manifold configured to be disposed between an inducer and an exhaust vent;

FIG. 13 is a cross section of a portion of the exhaust manifold;

FIG. 17 is an isometric view of an air intake manifold having a low profile and configured to facilitate use of a multi-position condensate draining system in the furnace;

FIGS. 18 and 19 are different views of an inlet of the air intake manifold shown in FIG. 17; and FIG. 20 is an isometric view of a channel portion of the air intake manifold shown in FIG. 17.

DETAILED DESCRIPTION OF THE PREFERRED EMBODIMENT(S)

Figure 1:
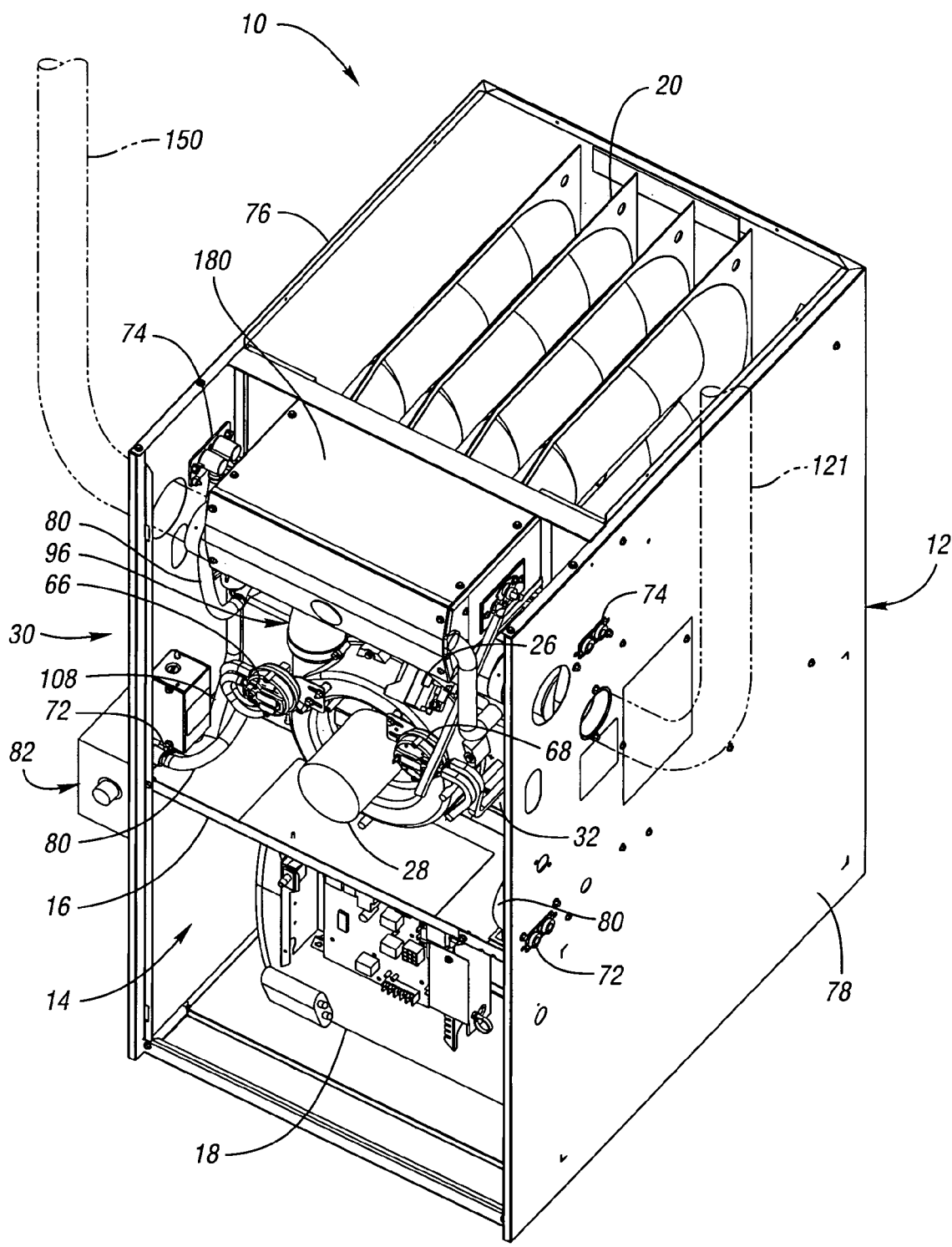
FIG. 1 is an isometric view of a furnace in accordance with the present invention, shown in an upflow position.
Figure 2:
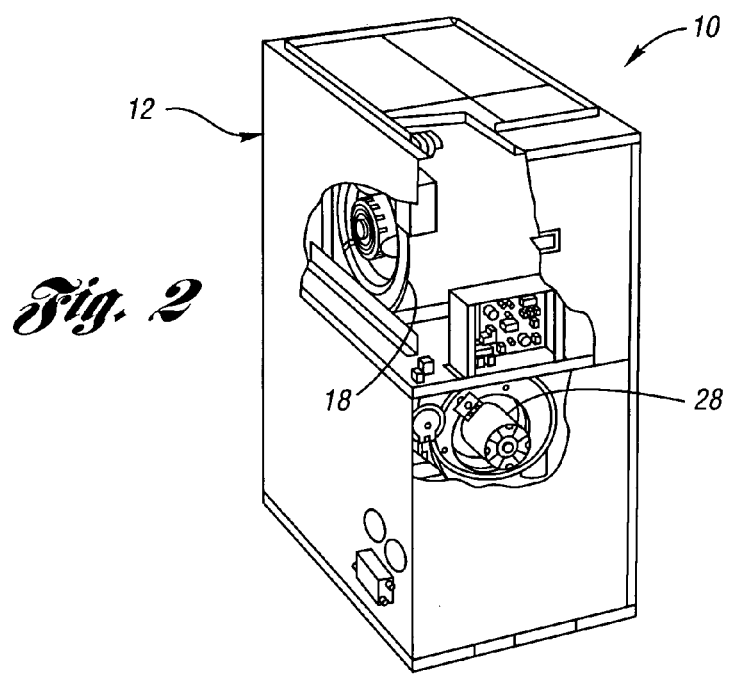
FIG. 2 is a partial fragmentary isometric view of the furnace oriented in a downflow position.
Figure 3:
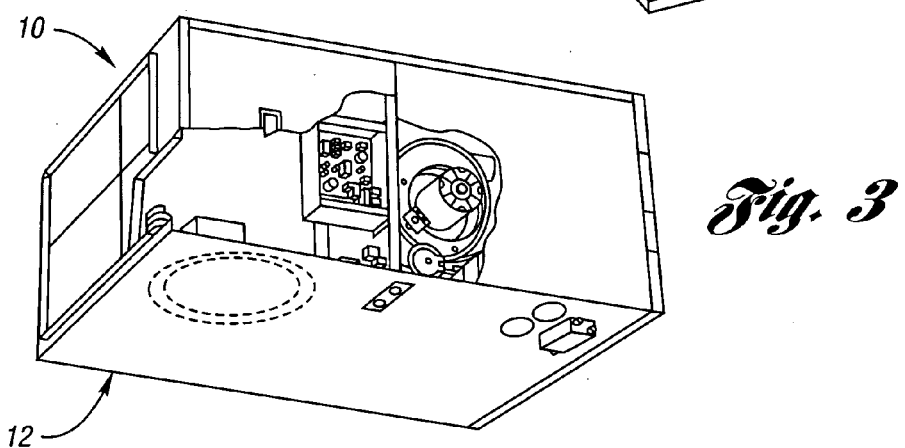
FIG. 3 is a partial fragmentary isometric view of the furnace shown in a right horizontal flow position.

FIGS. 1–4 show a furnace 10 in accordance with the present invention. The furnace 10 is shown in FIG. 1 in an upflow position, and in FIGS. 2–4, it is shown in a downflow, right horizontal flow, and left horizontal flow position, respectively. Referring now to FIGS. 1–4, and in particular, FIGS. 1 and 4, the furnace 10 includes a cabinet 12 which generally defines a furnace interior 14. The furnace interior 14 is divided into two compartments by an interior partition 16. On one side of the partition 16 is a blower compartment in which a supply air blower 18 is located. On the other side of the partition 16 is a heat exchanger compartment, in which a primary heat exchanger 20 and a secondary heat exchanger 22 are located. The furnace 10 also includes a number of burners 24, which burn a combustible gas-air mixture. The burners 24 communicate with the primary heat exchanger 20, which in turn, communicates with the secondary heat exchanger 22. Hot combustion gasses from the burners 24 flow through the primary heat exchanger 20 where they are cooled prior to flowing through the secondary heat exchanger 22. A gas valve 26 controls the supply of gas to the burners 24, and an induced draft blower, or inducer 28, induces a flow of products of combustion through the heat exchangers 20, 22.

Figure 4:
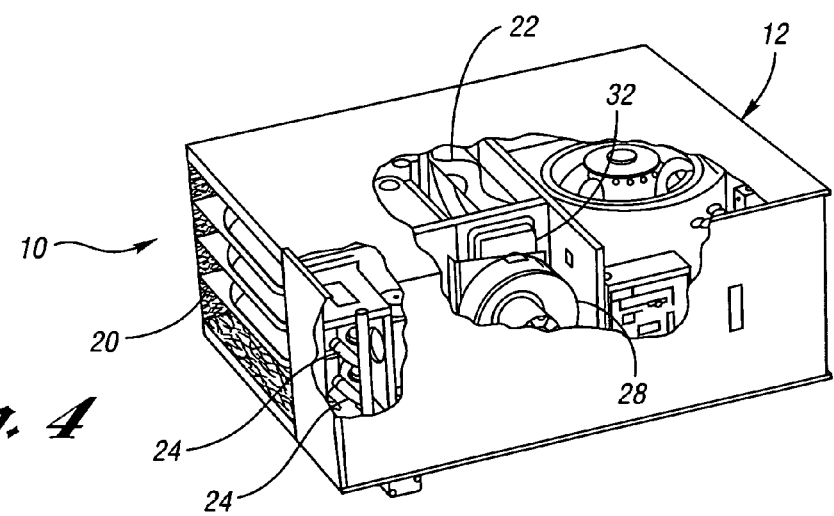
FIG. 4 is a partial fragmentary isometric view of the furnace shown in a left horizontal flow position.
Figure 5:
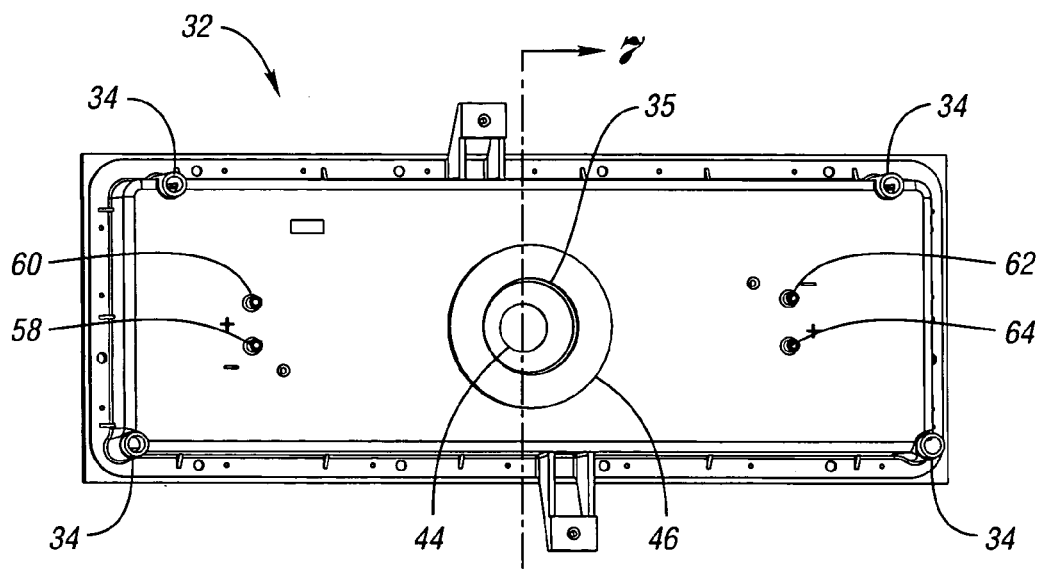
FIG. 5 is an isometric view of the front of a manifold configured for attachment to the furnace between a heat exchanger and an inducer.

The furnace 10 also includes a multi-position condensate draining system, indicated generally by the numeral 30, and described in detail with reference to individual elements of the system 30. For example, the condensate draining system 30 includes a manifold, or cold end header box 32. As shown in FIG. 4, the header box 32 is disposed between the inducer 28 and the secondary heat exchanger 22. As best seen in FIG. 5, the header box 32 includes four drain ports 34 positioned to drain condensate fluid. The drain ports 34 are positioned so that at least one of them is capable of draining fluid from the header box 32 when the furnace 10 is positioned for downflow, upflow, left horizontal flow, or right horizontal flow operation. An aperture 35 allows the header box 32 to communicate with the inducer 28.

Figure 6:
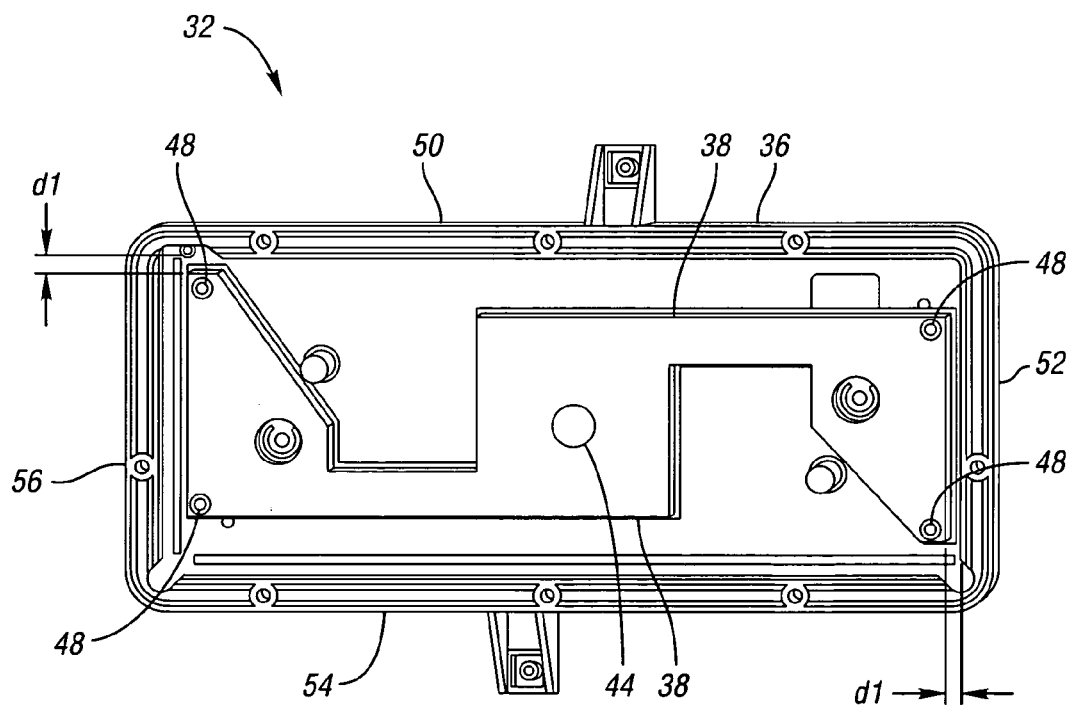
FIG. 6 is an isometric view of the backside of the manifold shown in FIG. 5.
Figure 7:
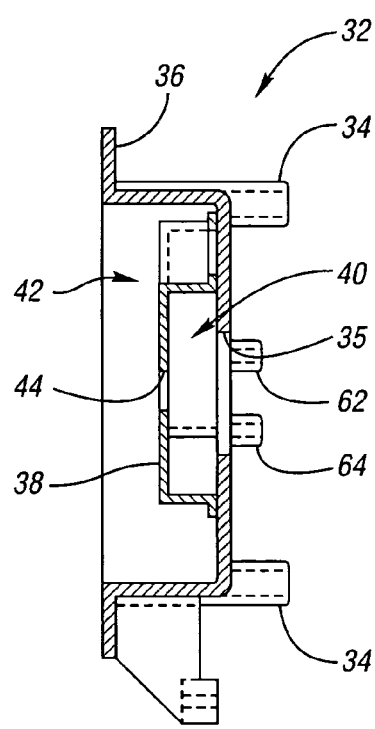
FIG. 7 is a cross section of the manifold shown in FIG. 5, taken through lines 7—7.

As shown in FIGS. 6 and 7, the header box 32 includes a first portion 36 and a second portion 38. The first and second portions cooperate to define first and second chambers 40, 42. The first portion 36 includes the drain ports 34, which are configured to facilitate fluid flow out of the second chamber 42. A sharp edged orifice 44 is disposed through the second portion 38, and allows the inducer 28 to draw combustion gasses from the second heat exchanger 22 into the second chamber 42. A gasket 46 surrounds the aperture 35 to seal the interface between the header box 32 and the inducer 28.

When the furnace 10 is in operation, the inducer 28 draws combustion gasses from the secondary heat exchanger 22 through the header box 32, thereby creating a negative pressure in both the first and second chambers 40, 42. The pressure in the first chamber 40 is slightly more negative than the pressure in the second chamber 42. As condensate collects in the header box 32, it tends to collect in the second chamber 42. As shown in FIG. 6, the second portion 38 of the header box 32 includes four drain holes 48. If condensate fluid does collect in the first chamber 40, the drain holes 48 allow the condensate to drain from the first chamber 40 into the second chamber 42 when the furnace 10 is in an off cycle. Because of the placement of the holes 48, fluid will drain out of the first chamber 40 regardless of whether the furnace 10 is positioned for downflow, upflow, left horizontal flow, or right horizontal flow operation.

As shown in FIG. 6, the first manifold portion 36 includes four side members 50, 52, 54, 56. The second manifold portion 38 is offset from the side members 50, 52, 54, 56 by a predetermined distance (d1). Providing this offset helps to ensure that condensate building up in the second chamber 42 will not flow back into the first chamber 40 through the drain holes 48. Although the second manifold portion 38 is shown in FIG. 6 having an offset distance (d1) that is the same on all four sides of the first manifold portion 36, one or more of the sides may have a different offset distance, as desired.

As best seen in FIG. 5, the header box 32 includes two pairs of bosses 58, 60 and 62, 64, each of which is disposed in the first manifold portion 36. A first boss 58, 62 in each of the pairs, is in communication with the first chamber 40. Conversely, the second boss 60, 64 in each pair, is in communication with the second chamber 42. As shown in FIG. 5, the second bosses 60, 64 are indicated by a plus sign (+). As discussed above, when the inducer 28 is operating, the pressure in the second chamber 42 is not positive, but it is slightly less negative than the pressure in the first chamber 40. Hence, the plus sign (+), which may be conveniently used to distinguish the bosses, is indicative of a relative pressure between the two chambers 40, 42. By having one boss 58, 62 from each pair communicate with the first chamber 40, and a second boss 60, 64 from each pair communicate with the second chamber 42, it is easy to obtain a pressure differential across the orifice 44.

FIG. 1 shows two pressure sensors 66, 68, one of which, the pressure sensor 66, is connected to one of the pairs of bosses 58, 60 with hoses (not visible). The second pressure sensor 68 is attached to the other pair of bosses 62, 64. By providing the furnace 10 with two factory installed pressure sensors 66, 68, each of which is already attached to a corresponding pair of bosses, an installation technician does not need to install a pressure sensor in the field, regardless of the furnace orientation. The bosses 58, 62, are located far enough away from the edges of the second portion 38 that it is not likely that condensate will accumulate enough to fill either of them. If, however, condensate does accumulate enough to plug one of the bosses 58, 62, it may be indicative of a condensate draining problem. To address this issue, the pressure sensors 66, 68 can be configured to disable the furnace if the differential pressure being measured is less than a predetermined pressure, which may occur if one of the bosses becomes blocked with liquid condensate.

FIGS. 8–11 show different styles of connectors that can be used with the furnace 10. In order to facilitate ease of installation of the furnace 10 in any of the four flow positions discussed above, two connectors 72, and two other connectors 74, are attached to cabinet walls 76, 78. Each of the connectors 72, 74 is connected by a hose 80 (only three of which are visible in FIG. 1) to a respective drain port 34 in the header box 32. A trap 82 is connected to one of the connectors, such as the connector 72 shown in FIG. 1, to receive the condensate fluid from the header box 32. The furnace 10 can be assembled at the factory with all of the connectors 72, 74 installed in cabinet walls, and with a hose attached to a respective drain port 34 in the header box 32. Thus, the furnace 10 can be installed for downflow, upflow, left horizontal flow, or right horizontal flow operation, and the installation technician need only attach the trap 82 to the appropriate connector to facilitate proper condensate draining.

Figure 8:
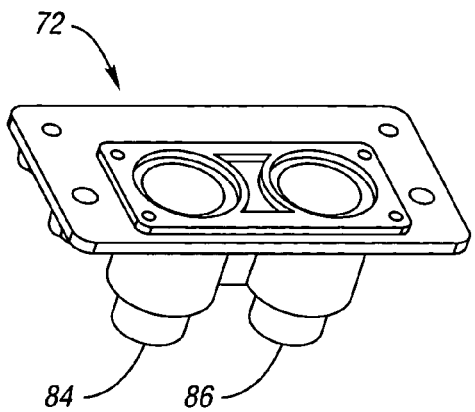
FIGS. 8 and 9 are different isometric views of a connector used to facilitate the flow of condensate fluid through a cabinet wall of the furnace.
Figure 9:
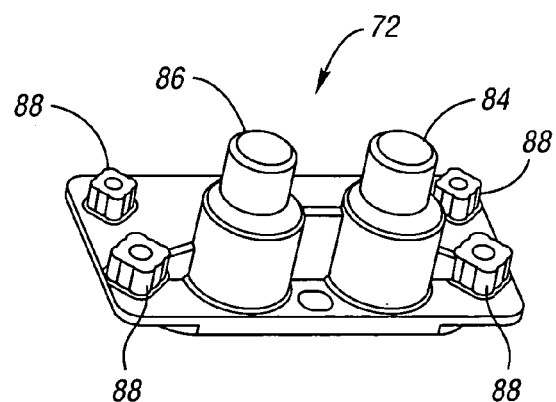
Figure 10:
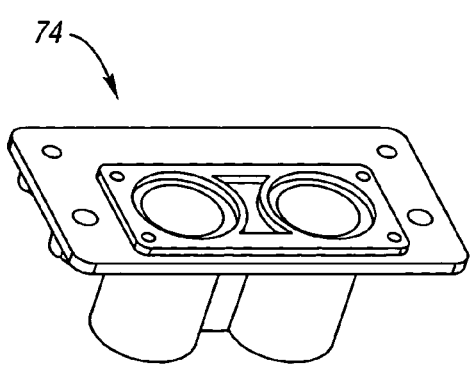
FIGS. 10 and 11 show an alternative embodiment of the connector shown in FIGS. 8 and 9.
Figure 11:
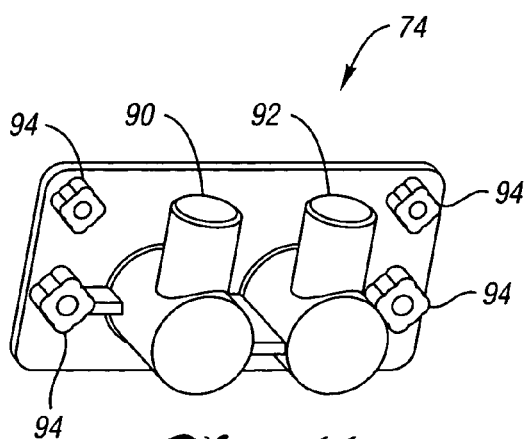

FIGS. 8 and 9 show the connectors 72. Each connector 72 has two inlets 84, 86, only one of which will receive a hose 80 from a drain port 34 on the header box 32. As explained more fully below, the other inlet in each of the connectors receives condensate from a different portion of the condensate draining system 30. The inlets 84, 86 are configured with straight connectors, and are therefore used where there is ample room for a hose to approach the connector 72 straight-on. The connectors 72 may be made from acrylonitrile butadiene styrene (ABS), or some other suitable material. Bosses 88 can be molded into the connector 72 to facilitate attachment of the connector 72 to a corresponding furnace wall with a threaded fastener or the like. Unlike the straight connectors 72, the connectors 74, shown in FIGS. 10 and 11, have inlets 90, 92 that are offset 90° to facilitate attachment of hoses in areas of the furnace 10 where there may not be room enough for a hose connection to a straight connector, such as the connectors 72. As with the connectors 72, the connectors 74 include bosses 94 which facilitate connection of the connectors 74 to a corresponding cabinet wall.

As discussed above, each of the connectors 72, 74 includes two inlets, only one of which is connected to the header box 32. The other inlet on each connector 72, 74 is connected to an exhaust manifold 96. The exhaust manifold 96 is in communication with the inducer 28 and ambient environment, usually outside the building being heated. The exhaust manifold 96 receives combustion gasses from the inducer 28, and transfers them outside of the furnace 10, usually through an exhaust duct (not shown) which is open to the ambient environment outside the building. As shown in FIG. 12, the exhaust manifold 96 includes an inlet 98, and two outlets 100, 102. The inlet 98 receives the combustion gasses from the inducer 28, while one of the outlets 100, 102 is connected to an exhaust duct to vent the combustion gasses outside the building. The other outlet 100, 102 can be capped-off at the time the furnace 10 is installed. The exhaust manifold 96 includes four drain ports 104, 106. By having four drain ports, the exhaust manifold 96 can be installed in the furnace 10 at the factory, and no adjustments are needed in order for condensate to effectively drain when the furnace is positioned for downflow, upflow, left horizontal flow, or right horizontal flow operation. Thus, an installation technician need only cap one of the outlets 100, 102 depending on the installation orientation of the furnace 10. Each of the drain ports 104, 106 is attached to a corresponding connector 72, 74 with a hose 108, only one of which is visible in FIG. 1.

The exhaust manifold 96, which can be made from ABS, or any other suitable material, is conveniently configured in three pieces. As shown in FIG. 12, the exhaust manifold 96 includes a tee 110 and two pipe sections 112, 114. Each of the pipe sections 112, 114 may be conveniently attached to the tee 110 with clamps 116. The two pipe sections 112, 114 are substantially the same, except for the length. This makes the exhaust manifold 96 a versatile component, in that merely changing the length of one of the two pipe sections changes the offset of the inlet 98 to accommodate various furnace configurations.

FIG. 13 shows a cross section of the pipe section 114. The pipe section 114 includes a flange 118 that includes a pair of mounting holes 120 that are used to connect the pipe section 114 to the cabinet 12. An exhaust vent 121, shown in phantom in FIG. 1, can be glued to the outlet 102 and vented to an ambient environment. The side of the exhaust manifold 96 opposite the exhaust vent 121 will be capped. From the cross section shown in FIG. 13, it is clear that the drain port 106 has a larger diameter than the drain port 104. The drain port 106 has a larger diameter to help ensure that condensate does not flow out of the inlet 98 and back into the inducer 28 when the furnace 10 is oriented for upflow operation. As shown in FIG. 1, when the furnace 10 is oriented for upflow operation, the exhaust manifold 96 is above the inducer 28. In this orientation, condensate forming in the exhaust vent 121 can flow back into the exhaust manifold 96 and into the inducer 28. Therefore, the larger drain ports 106 help to ensure that all of the condensate received by the exhaust manifold 96 is successfully drained into the trap 82. When the furnace 10 is configured for downflow operation or horizontal operation, the exhaust manifold 96 is not located above the inducer 28, and the drain ports 104, are large enough to drain all of the condensate that accumulates in the exhaust manifold 96.

Figure 14:
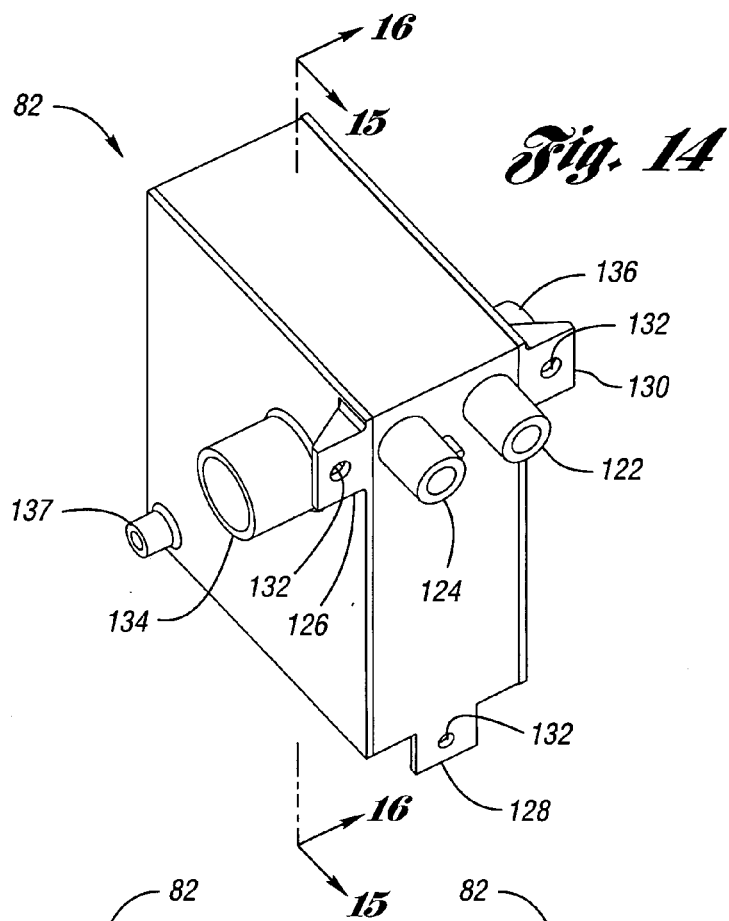
FIG. 14 is an isometric view of a trap configured for attachment to one of the connectors shown in FIGS. 8–11.

FIG. 14 shows a perspective view of the trap 82. The trap 82 includes two inlets 122, 124. The inlets 122, 124 are configured to fit into the connectors 72, 74 on the outside of the cabinet 12, as shown in FIG. 1. As described above, one of the connectors 72, 74 receives condensate fluid from the header box 32, and the other of the connectors 72, 74 receives condensate fluid from the exhaust manifold 96. Thus, one of the inlets 122, 124 of the trap 82 receives fluid from the header box 32, while the other inlet 122, 124 receives fluid from the exhaust manifold 96. Because the trap 82 is substantially symmetrical, either inlet 122, 124 can be configured to communicate with either the header box 32 or the exhaust manifold 96.

The trap 82 also includes flanges 126, 128, 130. Each of the flanges 126, 128, 130 includes a mounting hole 132 that can be used to attach the trap 82 to the furnace cabinet 12 with, for example, threaded fasteners. The trap 82 also includes drain ports 134, 136, one of which can be connected to a drain which communicates with the ambient environment outside the furnace 10. The other drain port 134, 136 can be capped at the time of installation. To facilitate cleaning of the trap 82, clean-out holes 137, 139 are provided—see FIGS. 14 and 16. The clean-out holes 137, 139 have plugs (not shown) installed at the factory, to keep condensate from draining out of the trap. When a service technician wants to clean a trap, such as the trap 82, the plugs are easily removed, and replaced when the cleaning is complete.

Figure 15:
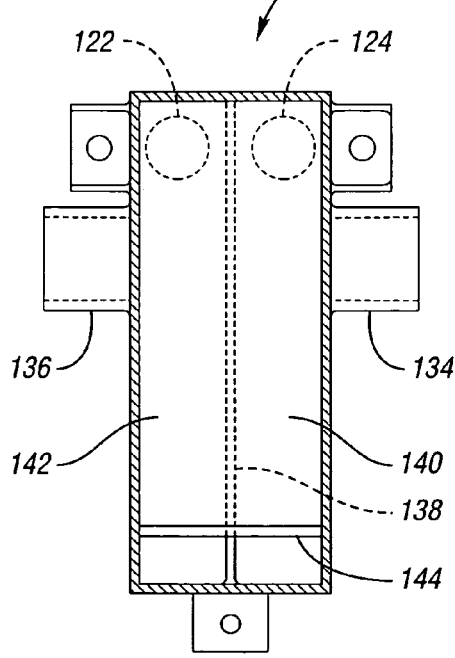
FIG. 15 is a cross section of the trap taken through lines 15—15 in FIG. 14.
Figure 16:
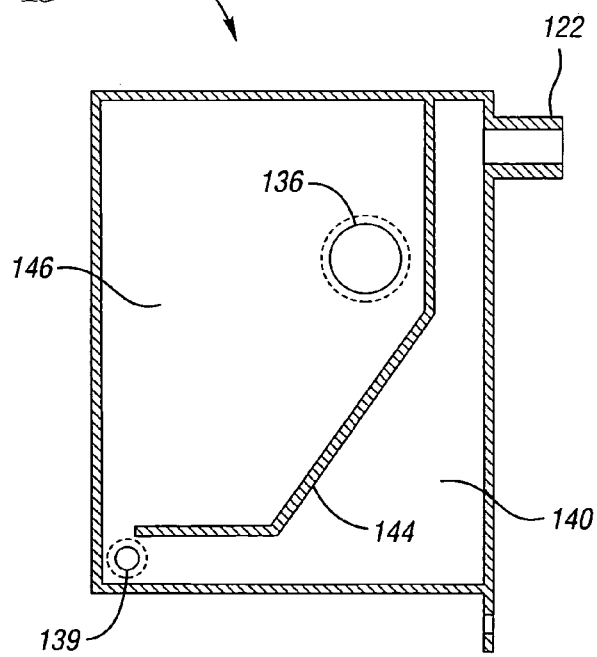
FIG. 16 is a cross section of the trap taken through lines 16—16 in FIG. 14.

FIG. 15 shows a cross section of the trap 82 taken through lines 15—15 in FIG. 14. The trap 82 includes a first partition 138 that divides the inside of the trap 82 into first and second chambers 140, 142. As shown in FIG. 16, a second partition 144 defines a third chamber 146 within the trap 82. Condensate water collecting in the trap 82 will effectively form a pressure seal that keeps exhaust gasses from the exhaust manifold 96 from passing through the trap 82 and into the ambient environment.

In addition to having a condensate draining system 30 which facilitates easy installation of the furnace 10 in various different flow orientations, the furnace 10 also provides installation in a relatively small space because of the compact configuration of various components. For example, FIG. 1 shows an air intake manifold 148 configured to receive air from a furnace air intake 150, shown in phantom. The air intake manifold 148 is disposed between the furnace air intake 150 and the burners 24. As best seen in FIG. 17, the air intake manifold 148 includes a pair of inlets 152, 154, and an outlet 156. At the time the furnace 10 is installed, one of the inlets 152, 154 can be connected to an air intake, such as the air intake 150. The other inlet 152, 154 can be capped by the installation technician.

The air-intake manifold 148 includes three separate pieces, the two inlets 152, 154 and a channel 158. The inlets 152, 154 are configured substantially the same, and can be attached to either side of the channel 158. FIGS. 18 and 19 show one of the inlets 152 in detail; however, it is understood that the following description applies equally to the inlet 154. As shown in FIG. 18, the inlet 152 includes a first portion 160, a second portion 162, and a transition portion 164 between the first and second portions 160, 162. In the embodiment shown in FIGS. 17–19, the first portion 160 of the inlet 152 has a round cross section with an inside diameter (D) that defines a first area. The round cross section of the first portion 160 facilitates attachment of an air intake, such as the air intake 150, which may commonly be one or more sections of polyvinyl chloride (PVC) or ABS pipe.

As best shown in FIG. 19, the second portion 162 of the inlet 152 has a generally rectangular cross section, defined by a depth (d2) and a height (h), which define a second area. The depth (d2) of the second portion 162 is smaller than the inside diameter (D) of the first portion 160. This gives the air intake manifold 148 a low profile, which allows it to be installed in a multi-position furnace, such as the furnace 10. Moreover, the compact design of the air intake manifold 148 improves access for servicing and installing other furnace components, and provides clearance for routing the air intake 150, a vent pipe, gas supply lines, and condensate drain lines.

In order to ensure that there is not a large pressure drop across the inlet 152, the height (h) of the second portion 162 is larger than the depth (d2). Thus, the second area, which is generally rectangular, and defined by the depth (d2) and the height (h), can be greater than or equal to the first area, which is circular and defined by the inside diameter (D). The transition portion 164 helps to inhibit airflow resistance as the cross section changes from a circular cross section in the first portion 160 to the rectangular cross section of the second portion 162.

FIG. 20 shows the channel 158, which includes three sides 166, 168, 170, and two open ends 172, 174. Each of the inlets 152, 154 includes a plurality of protrusions 176—see FIGS. 17–18. The protrusions 176 are configured for snap-fit attachment to the channel 158 at apertures 178. As shown in FIG. 17, two protrusions 176 on each inlet 152, 154 are not attached to the channel 158. These protrusions 176 can be used to locate the air intake manifold 148 on a burner enclosure 180—see FIG. 1. The air intake manifold 148 can then be secured to the burner enclosure 180 with threaded fasteners or the like, inserted through apertures 182 in flanges 184 disposed along a length of the channel 158.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A furnace for supplying heated air to a space to be heated and capable of being installed in more than one position, the furnace including at least one burner and a heat exchanger in communication with the at least one burner for receiving products of combustion therefrom, the furnace further including an inducer in communication with the heat exchanger for inducing a flow of products of combustion through the heat exchanger and out of the furnace, the furnace comprising:

a multi-position condensate draining system, the condensate draining system including an exhaust manifold in communication with the inducer and an ambient environment, and configured to facilitate transfer of combustion gases out of the furnace, the exhaust manifold including at least four drain ports positioned to drain fluid from the exhaust manifold, at least a first two of the drain ports being positioned on one side of the exhaust manifold, and at least a second two of the drain ports being positioned generally opposite the first two of the drain ports, and wherein the first two drain ports are larger than the second two drain ports, thereby providing increased drainage capacity when the furnace is oriented such that the exhaust manifold is above the inducer.

2. The furnace of claim 1, wherein the condensate draining system further includes a trap in communication with the exhaust manifold and an ambient environment, the trap including an inlet connected to the exhaust manifold at one of the drain ports for receiving fluid from the exhaust manifold, the trap being configured to inhibit non-liquid products from passing through the trap and into the ambient environment.

3. The furnace of claim 1, wherein the exhaust manifold includes an inlet and two outlets, the exhaust manifold inlet being connected to the inducer, and at least one of the exhaust manifold outlets being in communication with an ambient environment.

4. The furnace of claim 3, wherein the exhaust manifold further includes a tee and two pipe sections attached to the tee, the tee including the exhaust manifold inlet, and each of the pipes including one of the exhaust manifold outlets and at least one of the drain ports.

5. A furnace for supplying heated air to a space to be heated and capable of being installed in more than one position, the furnace including an air intake for receiving air from an ambient environment, at least one burner, and a heat exchanger in communication with the at least one burner for receiving products of combustion therefrom, the furnace further including an inducer in communication with the heat exchanger for inducing a flow of products of combustion through the heat exchanger and out of the furnace, the furnace comprising:

an air intake manifold disposed between the furnace air intake and the at least one burner and configured to facilitate air flow therebetween, the air intake manifold including an outlet and at least one inlet, the at least one inlet communicating with the furnace air intake, and the outlet communicating with the at least one burner, the at least one inlet including a first portion with a first cross section having a linear dimension and defining a first area, and a second portion with a quadrilateral cross section having a depth and a height and defining a second area, the depth of the quadrilateral cross section being smaller than the linear dimension of the first cross section.

6. The furnace of claim 5, wherein the second area is greater than or equal to the first area.

7. The furnace of claim 5, wherein the first cross section is generally circular and the quadrilateral cross section is generally rectangular.

8. The furnace of claim 5, wherein the at least one air intake manifold inlet further includes a transition portion disposed between the first and second portions for inhibiting air flow resistence.

9. The furnace of claim 5, wherein the air intake manifold further comprises a channel having at least three sides and two open ends, the channel including a pair of flanges disposed along a length of the channel.

10. The furnace of claim 9, wherein the air intake manifold channel includes a flange configured to facilitate attachment of the air intake manifold to the furnace.

11. The furnace of claim 9, wherein the at least one inlet includes at least one protrusion configured to mate with a corresponding aperture in the channel.

* * * * *